US008645275B2

(12) United States Patent
Seifert et al.

(10) Patent No.: US 8,645,275 B2
(45) Date of Patent: *Feb. 4, 2014

(54) SYSTEMS AND METHODS FOR VERIFYING IDENTITIES

(71) Applicant: The Western Union Company, Englewood, CO (US)

(72) Inventors: Dean Seifert, Parker, CO (US); Matt Bixler, Denver, CO (US); Dave Owen, Castle Rock, CO (US); Elizabeth Petri, Littleton, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,432

(22) Filed: May 17, 2013

(65) Prior Publication Data

US 2013/0311374 A1 Nov. 21, 2013

Related U.S. Application Data

(63) Continuation of application No. 12/953,291, filed on Nov. 23, 2010, now Pat. No. 8,468,096, which is a continuation of application No. 11/923,481, filed on Oct. 24, 2007, now Pat. No. 7,865,439.

(51) Int. Cl.
*G06Q 40/00* (2012.01)
(52) U.S. Cl.
USPC .................. 705/44; 705/39; 705/35; 705/40; 705/64; 705/36 R

(58) Field of Classification Search
USPC ............ 705/1.1, 44, 39, 35, 40, 21, 64, 36 R; 235/379, 380, 383, 454; 726/9, 21, 6, 726/28
See application file for complete search history.

(56) References Cited

U.S. PATENT DOCUMENTS

2004/0215557 A1* 10/2004 Michelsen ...................... 705/39

OTHER PUBLICATIONS

Herman M. Kessy- "Guidelines for the Verification of Customers' Identifies"—The United Republic of Tanzania Financial Intelligence Unit; 2006.*

* cited by examiner

*Primary Examiner* — John H Holly
(74) *Attorney, Agent, or Firm* — Kilpatrick Townsend & Stockton, LLP

(57) ABSTRACT

A method for verifying the identity of one party on behalf of another party is provided. The method includes providing a money-transfer system and a communication system that communicates with the money-transfer system; receiving at the money-transfer system from the first party certain verification criteria for confirming the identity of a second party; and storing the verification criteria in the host computer system of the money-transfer system. When an ID is received from the second party at a money-transfer location; the verification criteria is retrieved from the host computer system; and the acceptability of the ID is determined in accordance with the verification criteria. If the identification device is acceptable, identification information is obtained from the identification device; and the identification information is processed to verify the identity of the second party. In other embodiments, a method for pre-verifying the identity of a party and a system for performing the method of the invention are provided.

20 Claims, 3 Drawing Sheets

SYSTEMS AND METHODS FOR VERIFYING IDENTITIES

CROSS-REFERENCES TO RELATED APPLICATIONS

This application is a continuation of U.S. patent application Ser. No. 12/953,291 filed Nov. 23, 2010 and titled "SYSTEMS AND METHODS FOR VERIFYING IDENTITIES, which is a continuation of U.S. patent application Ser. No. 11/923,481, filed on Oct. 24, 2007, now U.S. Pat. No. 7,865, 439, entitled SYSTEMS AND METHODS FOR VERIFYING IDENTITIES, which are all incorporated by reference herein for any and all purposes.

This application is related to co-pending commonly assigned U.S. patent application Ser. No. 10/424,562, filed Apr. 25, 2003, entitled "SYSTEMS AND METHODS FOR VALIDATING IDENTIFICATIONS IN FINANCIAL TRANSACTIONS", which is related to co-pending, commonly assigned U.S. patent application Ser. No. 10/424,558, filed Apr. 25, 2003, entitled: "SYSTEMS AND METHODS FOR VALIDATING IDENTIFICATIONS IN FINANCIAL TRANSACTIONS" and commonly assigned Provisional U.S. Patent Application No. 60/465,967, filed Apr. 25, 2003, entitled: SYSTEMS AND METHODS FOR PRODUCING SUSPICIOUS ACTIVITY REPORTS IN FINANCIAL TRANSACTIONS", the entire disclosures of which are incorporated herein by reference for all purposes.

BACKGROUND OF THE INVENTION

The present invention relates generally to methods and systems for confirming the identity of a party seeking to be involved in a financial transaction with another party. Specifically, the invention provides identification verification methods and systems employing a money-transfer system having a plurality of transaction locations.

In a face-to-face transaction, positive identification of one party is many times established through the physical presentation of some sort of identification device to the other party, e.g. a driver's license, passport, social security card, biometric feature, etc. In some cases, this identification device is adequate to establish the identity of the party, particularly if the identification device incorporates a feature, e.g. a picture, signature, etc, that can be easily compared in person with the physical traits of the party presenting the identification device. However, in other cases, the identification device may be counterfeit or forged, and the party accepting the identification material may not have the tools, technology and/or training to properly detect that the identification device is not authentic. Furthermore, in an on-line transaction, one party is not able to physically present the identification device to the other party. Therefore, in some cases, parties to a transaction, e.g. non-financial institutions, merchants, government agencies, banks, etc. often rely upon faxed copies or other electronically-transmitted facsimiles of the identification device to verify identity, sometimes coupled with inquiries to major credit reporting agencies. Again, this identification method is vulnerable to identity theft, forgery and/or counterfeiting, and has the potential to be used by an identity thief to perform seemingly valid transactions for fraudulent purposes.

Many people use the services of money-transfer service providers to send funds to other people or to purchase negotiable instruments such as money orders and travelers checks. Electronic communication and financial services networks have now developed to a point that allows such transactions to have a nearly global reach, and money-transfer service providers typically have extensive money-transfer systems with locations in convenient geographies around the world. Unfortunately, some people attempt to use money-transfer service providers to transfer money for illegal or unethical purposes. As a result, various laws and regulations attempt to thwart this type of activity by requiring positive identification of individuals involved in certain money-transfer transactions; such as, for example, transactions above an established value threshold. In order to comply with these laws and regulations, money-transfer service providers and their associates are typically equipped with the tools, technology and training required to properly validate various identification devices, either by comparing the identification device with the physical traits of a consumer or business representative present at a money-transfer location, or by employing various systems and methods for identity verification that are associated with the money-transfer system. For example, systems and methods for confirming the validity of identification devices and identification information in money-transfer transactions are described in co-pending U.S. patent application Ser. No. 09/317,785, filed May 24, 1999; Ser. No. 10/424,558, filed Apr. 25, 2003; Ser. No. 10/424,562, filed Apr. 25, 2003; Ser. No. 10/832,809, filed Apr. 26, 2004; and Ser. No. 11/623,956, filed Jan. 17, 2007; all of which are incorporated herein by reference in their entirety for all purposes.

BRIEF SUMMARY OF THE INVENTION

Embodiments of the present invention provide methods and systems for verifying the identity of a party. In one embodiment, the invention provides a method for verifying the identity of one party on behalf of another party, e.g. verifying the identity of one party to a pending or potential financial transaction on behalf of another party to the transaction. In one embodiment of the invention, a money-transfer system is provided for making a third-party, in-person verification of the identity of a party by receiving of one or more identification devices (hereinafter sometimes referred to as an "ID") provided by the party, obtaining identification information from the ID and processing the identification information for identity verification.

One embodiment of a method according to the invention includes providing a money-transfer system having a host computer system, a network and a plurality of money-transfer locations with one or more transaction processing devices that communicate with the host computer system over the network, and a communication system that communicates with the money-transfer system; receiving at the money-transfer system from a first party over the communication system certain verification criteria for confirming the identity of a second party; and storing the verification criteria in the host computer system of the money-transfer system. An identification device may then be received from the second party at a money-transfer location; the verification criteria may be retrieved from the host computer system using the transaction processing device at the money-transfer location; and the acceptability of the identification device may be determined in accordance with the verification criteria. If the identification device is acceptable, identification information is obtained from the identification device; and the identification information is processed to verify the identity of the second party. Verification of the identity may then be provided to the first party, as well as the second party if desired.

In one embodiment, the identification information obtained from the ID may be transmitted to the host computer system, and the host computer system may be programmed to process the identification information for identity verification. In another embodiment, the identification information may be processed by an attendant at the money-transfer location physically comparing the identification information (e.g. a picture or signature) with one or more physical features of the second party (e.g. face or on-site signature) while the second party is present in-person at the money-transfer location. After the identity verification has been made, the second party may be provided with a written certification of identity that can be presented to the first party to complete a pending or potential transaction. In other embodiments, the first party may be notified of the results of the identity verification, e.g. by phone or electronically over the communication system, and if the identity verification is successful, the pending or potential transaction with the second party may automatically be completed upon such notification.

In another embodiment of the present invention, a method of "pre-verifying" the identity of a party may be provided. An identification device may be received from a party at a money-transfer location of a money-transfer system; identification information may be obtained from the identification device and processed for identity verification. The identity verification results may then be stored in the host computer system of the money transfer system. When a request is received at the money-transfer system, e.g. from the party or from another party wishing to enter into a transaction or relationship with that party, to provide verification of the identity of the party, the identity verification results may be retrieved from the host computer system; and the identity verification results may be provided in response to the request.

In another embodiment, a system may be provided for verifying the identity of one party on behalf of another party. The system may comprise a money-transfer system having a host computer system with storage media containing verification criteria provided by a first party for verifying the identity of a second party, a network, a plurality of money-transfer locations with one or more transaction processing devices that communicate with the host computer system over the network, and a communication system for communicating with the money-transfer system. The money-transfer locations may be adapted to receive an identification device from the second party and obtain identification information from the identification device in accordance with the verification criteria. The money transfer system may be adapted to process the identification information to verify the identity of the second party and to then transmit the identity verification results to the first party over the communication system. In one embodiment, the transaction processing devices at the money-transfer locations are adapted to retrieve the verification criteria from the host computer system, obtain the identification information from the identification device and to transmit the identification information to the host computer system. In another embodiment, the host computer system is programmed to process the identification information to verify the identity of the second part. In yet another embodiment, the system further comprises an identity verification database system.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
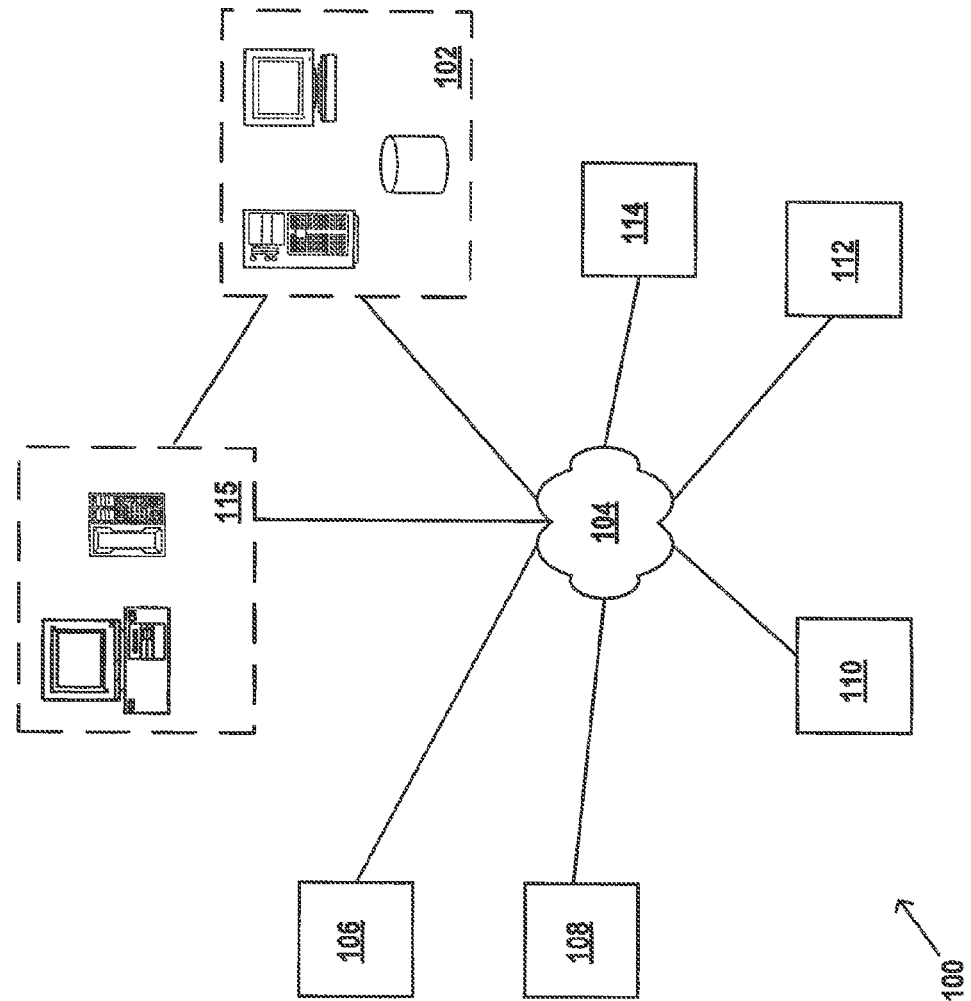
FIG. 1 illustrates a system for verifying an ID according to embodiments of the present invention.

According to the present invention, one party may employ a money-transfer system of a service provider to verify an ID presented by another party. Herein, "provider" or "service provider" will refer to a money-transfer service provider. For example, "provider" may refer to an entity such as Western Union of Englewood, Colo., whose money-transfer service and system of money-transfer locations is well known. Additionally, "associate" will refer to an entity that a money-transfer service provider may enlist to accomplish the money-transfer service at an outlying geographic location, i.e. a "money-transfer location". For example, third parties, such as merchants, financial institutions, and the like may be "associates" and their geographic location may be a "money-transfer location". Herein "attendant" will refer to someone with whom a customer interacts in the transaction process at a money-transfer location. An attendant may be an employee of a provider or associate, and a money-transfer location may be a location staffed by a provider or an associate. An attendant typically operates a transaction processing device, entering information received from the customer and/or related to a transaction. Further, although the phrase "money transfer" will be used herein to refer to the type of service normally provided by the system employed to confirm ID's in accordance with the present invention, that phrase will be understood to mean any financial transaction involving "value," which may include money, credits, customer loyalty points, other units of measure, and the like.

Also, herein an identification device ("ID") will refer to anything presented to establish positive identification. Exemplary ID's include ID cards, such as driver's licenses, military cards, employee cards and the like; passports; biometric features such as finger prints, retinal images, facial scans, DNA and the like; holographic images; and the like. ID's may include information that identifies the holder (herein "identification information"), including encoded information that may be read or scanned at a transaction device. Identification information may be on the face of the ID, e.g. a picture, signature, unique number, etc., an/or may be encoded in a magnetic stripe, a radio frequency generator, a one-dimensional or multi-dimensional bar code, or the like. ID's may be government-issued, privately issued, or integrally associated with an individual's anatomy.

The money-transfer process and money-transfer systems are well-known. Briefly, a sender presents himself to a service provider or associate at a location offering money-transfer services ("money-transfer location") and provides value, usually cash, to an attendant. Some service providers now even allow senders to transfer money by logging on to a web site and initiating money transfers using credit cards or other accounts, and such "virtual" locations are considered herein to be money-transfer locations. In either case, information may be entered into a record at the money-transfer location and that record may be transmitted to and received at a host computer system. The record typically includes information that identifies the sender, the recipient, and the amount of money being transferred, among other things. A recipient of the money transfer then presents himself to another money-transfer location of a provider or associate (a "receive site") to obtain the money or other value. An attendant at the receive site verifies the identity of the receiver and gives the receiver the value.

At the sending end of the transaction, the transaction information may be collected in any number of ways. In some cases, the information is collected by a point-of-sale ("POS") device specifically designed for money transfer and related transactions. The device may be operated by an attendant employed by the provider or an associate. In another case, the information may be collected using a computing device running application software specifically designed for money transfer and related transactions. In yet another case, the information may be collected by phone when an attendant contacts a customer service representative ("CSR") of the provider. The attendant is able to verify the sender's information and collect funds while the CSR enters the information into a transaction record. It also may be the case that the transaction is initiated by an associate who then must contact a CSR because the transaction exceeds certain thresholds. In yet another example, the customer provides some information to a CSR at a remote location while also entering some information into a transaction processing device by, for example, "swiping" a card through a reader on the device. Other examples are possible.

For a number of reasons, identity verification is a significant aspect to the money-transfer process. For example, in one instance, it is important to verify the identity of the sender. In an attempt to thwart illegal or unethical money transfers, it is helpful to confirm the identity of a sender, especially on transfers over certain value thresholds. Transfers over the thresholds may require the provider to obtain additional information from the sender. In some cases, the information may be compared to a list of known or suspected criminals. If a sender is a known criminal, identifying transactions initiated by the individual may provide security and law enforcement personnel assistance in stopping criminal activity such as money laundering, criminal activity funding, and tax evasion. Further, some individuals may attempt to avoid detection by segmenting a single money transfer into multiple smaller transfers below the thresholds. Thus, providers may employ measures described herein to relate transactions that might otherwise appear unrelated.

In an effort to avoid disclosing their identities, some individuals may attempt to use invalid ID's to establish their identities. Further, a wide variety of ID's are in common use, some of which may not be recognizable by attendants. Thus, one difficulty in the effort to establish positive identification is confirming the validity of ID's and the acceptability of a particular type of ID.

The present invention provides methods and systems that employ a money-transfer system to confirm the acceptability of ID types and may be used to verify the ID's presented by parties involved in various financial transactions other than money transfers. The methods and systems of the present invention provide for third-party identity verification of ID's at money-transfer locations in convenient geographies around the world. The money-transfer location may be operated by either the provider or an associate and is part of the provider's money-transfer system.

In one embodiment, the invention provides a method of verifying the identity of a second party on behalf of a first party using verification criteria provided by the first party. In another embodiment, the invention provides a method of providing verification of one party's identity to another party upon request. In still another embodiment, the invention provides a system for providing verification of the identity of one party to another party.

Attention is directed to FIG. 1, which illustrates an embodiment of a system 100 for providing identity verification according to the present invention. Identity verification system 100 includes the basic elements of a money-transfer system and a communication system 115 by which a first party may communicate with the money-transfer system. The money-transfer system may comprise a host computer system 102, a network 104 and a plurality of money-transfer locations having one or more of transaction processing devices 106, 108, 110 and 112.

Host computer system 102 may include, for example, server computers, personal computers, workstations, web servers, and/or other suitable computing devices. Host computer system 102 includes application software that programs host computer system 102 to perform one or more functions according to the present invention. For example, application software resident on host computer system 102 may program host computer system 102 to process identification information and verify an ID according to embodiments of the present invention. Host computer system 102 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. Host computer system 102 may be fully located within a single facility or distributed geographically, in which case a network may be used to integrate host computer system 102. Many other examples are possible and apparent to those skilled in the art in light of this disclosure.

Network 104 may be the Internet, an intranet, a wide area network (WAN), a local area network (LAN), a virtual private network, any combination of the foregoing, or the like. Network 104 may include both wired and wireless connections, including optical links. In some embodiments, network 104 may be a transaction-processing network.

The various transaction processing devices may be located at a plurality of money-transfer locations comprising the money-transfer system, and these transaction processing devices may be adapted to communicate with host computer system 102 over network 104. Accordingly, system 100 may include one or more POS devices 106 located at money-transfer locations. POS devices are more fully described in U.S. Pat. No. 6,547,132, issued on Apr. 15, 2003, the entire disclosure of which is incorporated herein by reference for all purposes. Essentially, POS devices are terminals for receiving transaction information and sending the information to host computer system 102. For example, POS device 106 may receive identification information by capturing it from an ID using a reader integral to or associated with the POS. POS device 106 also may receive identification information from an attendant or customer via a keypad, keyboard, and/or other input device. Other examples are possible.

System 100 also may include one or more computing devices 108 programmed to receive and transmit identification information from customers or attendants. Like POS devices 106, computing devices 108 may be located at money-transfer locations or at remote locations.

System 100 also may include one or more Customer Service Representative (CSR) computers 110. CSR computers 110 may be located, for example, at a call center or other money-transfer location operated by the service provider or an associate. CSR computers 110 function much like POS devices 106 and computing devices 108, except that identification information may be entered by a CSR who is receiving the identification information from a customer or associate by phone, for example. In some examples, a voice response unit may receive some or all of the identification information.

System 100 may also include one or more receiving sites 112 that comprise money-transfer locations from which customers may receive funds in a money-transfer transaction. Receive sites 112 may be equipped with one or more POS devices 106 or computing devices 108. The receive sites 112 also may be automated teller machines, kiosks (which are more fully described in U.S. patent application Ser. No. 10/225,410, filed on Aug. 20, 2002, the entire disclosure of which is incorporated herein by reference for all purposes), merchant store fronts, bank accounts, stored value accounts, and/or the like.

System 100 may also include one or more identity verification database systems 114. Identity verification database systems 114 may include any of the aforementioned databases and/or computing devices. Identity verification database systems 114 may be operated by government entities or private enterprises. Identity verification database systems 114 may include data from a single entity, such as driver's license data from a single State Department of Motor Vehicles, or may include data from a number of different entities that issue ID's. One example of such a commercial system is provided by Aristotle International, Inc. of Washington D.C. Another example is the service provided by Acxiom of Little Rock, Ark.

Communications system 115 may comprise any of a variety of communication devices by which a first party may communicate with host computer system 102, either directly or through network 104. For example, communication system 115 may comprise one or more well-known communication devices such as, for example, a personal computer, a laptop computer, a personal digital assistant (PDA), a telephone, a "Smart Phone", facsimile machine, etc.

Figure 2:
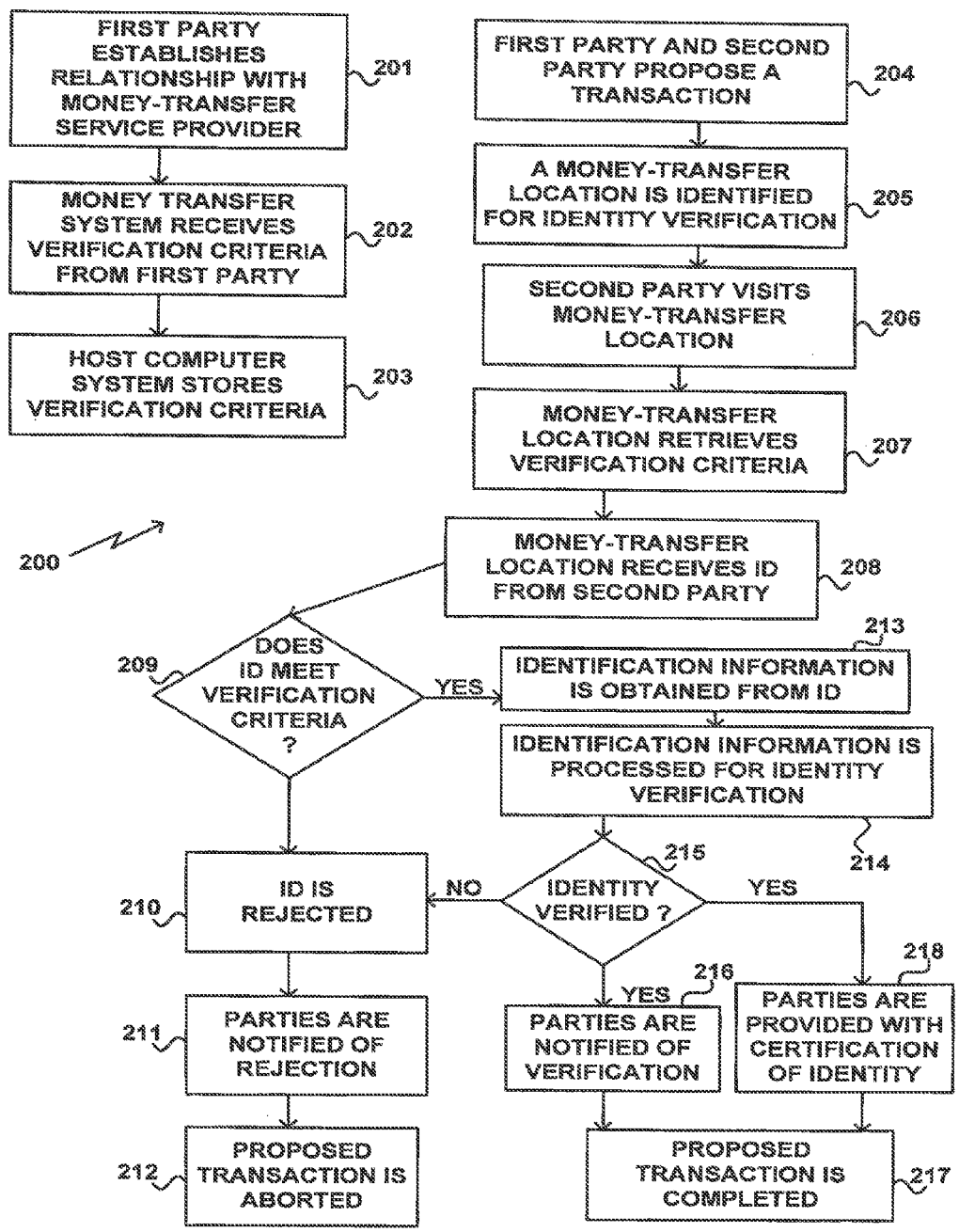
FIG. 2 illustrates a method of verifying an ID according to embodiments of the present invention.

Attention is now directed to FIG. 2, which illustrates a method 200 of verifying the identity of one party on behalf of another party in accordance with the present invention. Method 200 may be implemented in system 100 of FIG. 1 or another suitable money-transfer system. It should be noted that method 200 is exemplary only, and other embodiments may have more or fewer operations than the example of FIG. 2. Further, the operations may be carried out in a different order than that described herein.

At block 201, a first party may establish a relationship with a money-transfer service provider that provides a money-transfer system. For example, the first party may enter into a contract or other arrangement with a money-transfer service provider by which the first party may communicate certain verification criteria to the service provider's money-transfer system and the service provider agrees to provide identity verification services for a fee through the money-transfer system in accordance with the verification criteria. The first party may be a merchant, a bank, an individual or any other entity that wishes to verify the identity of one or more other parties; for example, a second party with which the first party is contemplating a financial transaction. Although the invention is herein described in the context of a commercial transaction, it is contemplated that the invention may also find use in non-commercial situations in which it is necessary or desirable for one party to verify the identity of another party, e.g. in background checks, due-diligence investigations, pre-marital investigations, pre-employment investigations, club membership investigations, and the like. In one embodiment, the first party and/or other parties may pay the identity verification fee to the money-transfer service provider.

At block 202, the money-transfer system may receive verification criteria from the first party over communication system 115, and the verification criteria may be stored in host computer system 102 of the money-transfer system at block 203 for future use. Verification criteria may specify the types of IDs, identification information, and/or procedures that must be obtained from a second party to verify the identity of the second party. For example, the criteria may include a requirement that the second party must physically present a picture ID at a money-transfer location, and that the picture on the ID must be physically matched by the attendant at the money-transfer location with the actual face of the second party. As another example, the criteria may include a requirement that the attendant obtain a signature of the second party at the location, and that the obtained signature be physically matched by the attendant with the signature on the ID. The criteria may also include a requirement that certain specified identification information must be obtained from the second party and/or the ID; for example, a scanned image of the ID, ID numbers or codes, biometric samples such as a fingerprint or facial scan, answers to certain pre-determined questions such as name, address, phone number, social security number, etc. and other questions the responses to which are personal to the second party, e.g. mother's maiden name, pet's name, first car, etc. The criteria may then require that the identification information be transmitted to host computer system 102 and/or to ID verification system 114 for further processing.

At block 203, the first party and a second party propose to enter into a transaction, relationship, etc. in which the parties cannot physically meet together, e.g. an on-line purchase, sale, investment or other remote transaction. Before completing the proposed transaction, the first party may wish to verify the second party's identity in accordance with the verification criteria. Accordingly, the first party may require the second party to visit a money-transfer location of system 100 for an identity verification, and may inform the second party of the verification criteria that the second party will be required to provide at the money-transfer location. Since the service provider's money-transfer system has an extensive network of geographically-dispersed money-transfer locations, including those that are accessible through a computing device 108 or CSR computer 110, one or more of the money transfer locations of system 100 may be identified at block 205 as being convenient for the second party to visit. At block 206, the second party may visit the money-transfer location and request that an identity verification be conducted on behalf of the first party. At block 207, the first party's verification criteria stored in host computer system 102 at block 202 may be retrieved at the money transfer location. For example, an attendant or the second party may retrieve the verification criteria using a POS device 106, a computing device 108, or other suitable transaction processing device at the money-transfer location which communicates with host computer system 102, or the location may be equipped with a phone for communicating with a CSR at a remote location that has access to a CSR computer 110 that is communication with host computer 102. The verification criteria may be retrieved from host computer system 102, for example, by selecting the first party's name from a list of names displayed on the transaction processing device, by entering an identifying code associated with the first party into the transaction processing device, or by any other suitable method for retrieving the verification criteria from the storage media of computer system 102.

At block 208, one or more IDs (collectively "ID") may be received from the second party at the money-transfer location, and a determination may be made at block 208 if the ID meets the verification criteria retrieved at block 207. If the determination at block 208 is that the ID does not meet the verification criteria; for example, if the ID is not in the format required by the verification (driver's license, passport, etc.) or does not contain a required feature (picture, signature, etc.), the ID may be rejected at block 209, e.g. by an attendant at the money-transfer location or by the transaction processing device. At block 211, the parties may be notified of the ID rejection by any suitable means, e.g. the second party may be notified of the ID rejection at the money-transfer location either orally or in writing by an attendant, or through a display on the transaction processing device, and the first party may be notified through communication system 115. Based on the ID rejection, either or both of the parties may choose to abort the pending transaction at block 212.

If the ID received from the second party meets the verification criteria at block 209, identification information may be obtained from the ID at block 213. As examples of identification information, mention may be made of a driver's license number, a passport number, a state identification number, an alien identification number, a government identification number, a social security number, a fingerprint, a retinal scan, a facial scan and DNA information. The identification information may then be processed for identity verification at block 214; for example, in accordance with any of the processes employed by money-transfer providers to verify the identity of parties involved in a money-transfer transaction.

As one example, the identification information may be obtained and processed for identity verification according to the teachings of previously-incorporated parent U.S. patent application Ser. No. 10/424,562. In accordance with those teachings, identification information may be obtained at block 213 by entering the information into a transaction processing device such as POS device 106, a computing device 108, or other suitable transaction processing device at the money-transfer location. The identification information may be obtained by "swiping" an ID card through a reader, or otherwise obtaining the information directly from an encoded ID. In another embodiment, identification information may be obtained merely by having the second party recite the ID number (e.g., a social security number) to an attendant, which the attendant enters into the transaction processing device. The identification information may also be obtained by a CSR receiving the information at a remote location over the phone. In addition to a single ID number, the identification information may be include a combination of numbers, letters, and/or other characters, a biometric feature, an image, and/or the like.

Processing the identification for identity verification at block 214 may include transmitting the identification information obtained at block 213 to host computer system 102 from a transaction processing device at the money-transfer location or from CSR computer 110. The identification information may then be processed for identity verification using the host computer system 102. In one embodiment, the identification information may include a number (which may include a combination of numerals, letters, and other characters), and computer system 102 may be programmed to compare the format of the number to known ID number formats to identify the ID type. Based on the ID type, the identification information may be transmitted by host computer 102 to an identity verification database system 114, which has information in one or more databases related to that specific ID type. Examples of such databases include driver's license database, social security database, identification verification company database, previous-used "valid" ID database, and credit reporting database. The identification information then may be compared to data in one or more of the databases to determine if a match exists. In some embodiments, computer system 102 may be programmed to "risk score" the identification information to assess the likelihood that the ID is valid. For example, if the identification information includes the customer's social security number and date of birth, the risk score may be based on the likelihood that a person of that age was issued the specific social security number. More detail regarding risk scoring of the identification information is found in previously-incorporated patent applications, e.g. U.S. patent application Ser. No. 10/424,562.

The processing of the identification information at block 214 may also include determining if the ID received from the second party at block 208 is of a known format. For example, if the identification information includes a number having a particular number of characters with specific characters in specific locations, then the identification information may be known as a driver's license number, for example. The same concept may be applied to other types of identification information. For example, a biometric feature may be encoded in a two-dimensional bar code. The identification information also may have a recognizable format that identifies it as, for example, a military ID. In another example, the identification information may be within a particular numerical sequence that identifies it as, for example, a passport. As another examples, the identity of the second party may be verified based on the physical characteristics of the ID (e.g., its size, color, layout, and/or the like, the presence of a hologram, photo, and the like). Thus, the processing of the identification information at block 213 may include a comparison of the format of the identification information to known formats to determine if the ID from which the information was obtained is known.

Processing of the identification information at block 214 may include merely comparing the identification information obtained at block 213 from a swiped ID to the information actually printed on the ID. The swiped identification information may be obtained at block 213 by employing a transaction processing device having magnetic reader, a one- or two-dimensional bar code reader, or the like. The swiped identification information may include an image of the second party to which an attendant can physically compare to the second party in-person or to the second party's image on the ID. Also in some embodiments, an attendant at the money-transfer location may obtain identification information at block 213 directly from the ID, e.g. by viewing a picture or signature on the ID, and verify the identity of the second party at block 213 by physically matching the picture or signature on the ID with the actual face or signature of the second party.

After processing of the identification information for identity verification is completed at block 214, a determination is made at block 215 as to whether the second party's identity can been successfully verified. If not, the ID is rejected at block 210. If the second party's identity is determined to have been successfully verified at block 215, the parties may be notified of the verification at block 216. This notification may be made electronically, by phone, by facsimile transmission, by mail, or other suitable communication means, including communication system 115 of system 100. Upon such notification, the proposed transaction may be completed by the parties at block 217. In some embodiments, the first party may arrange for the transaction to be completed automatically, e.g. upon receipt of the notification over communication system 115. In other embodiments, one or both parties may receive a written certification of identity at block 218, e.g. a written receipt, a written notice with an confirmation number, etc. In one embodiment, the second party may present the verification evidence to the first party to allow the completion of the transaction at block 217.

Figure 3:
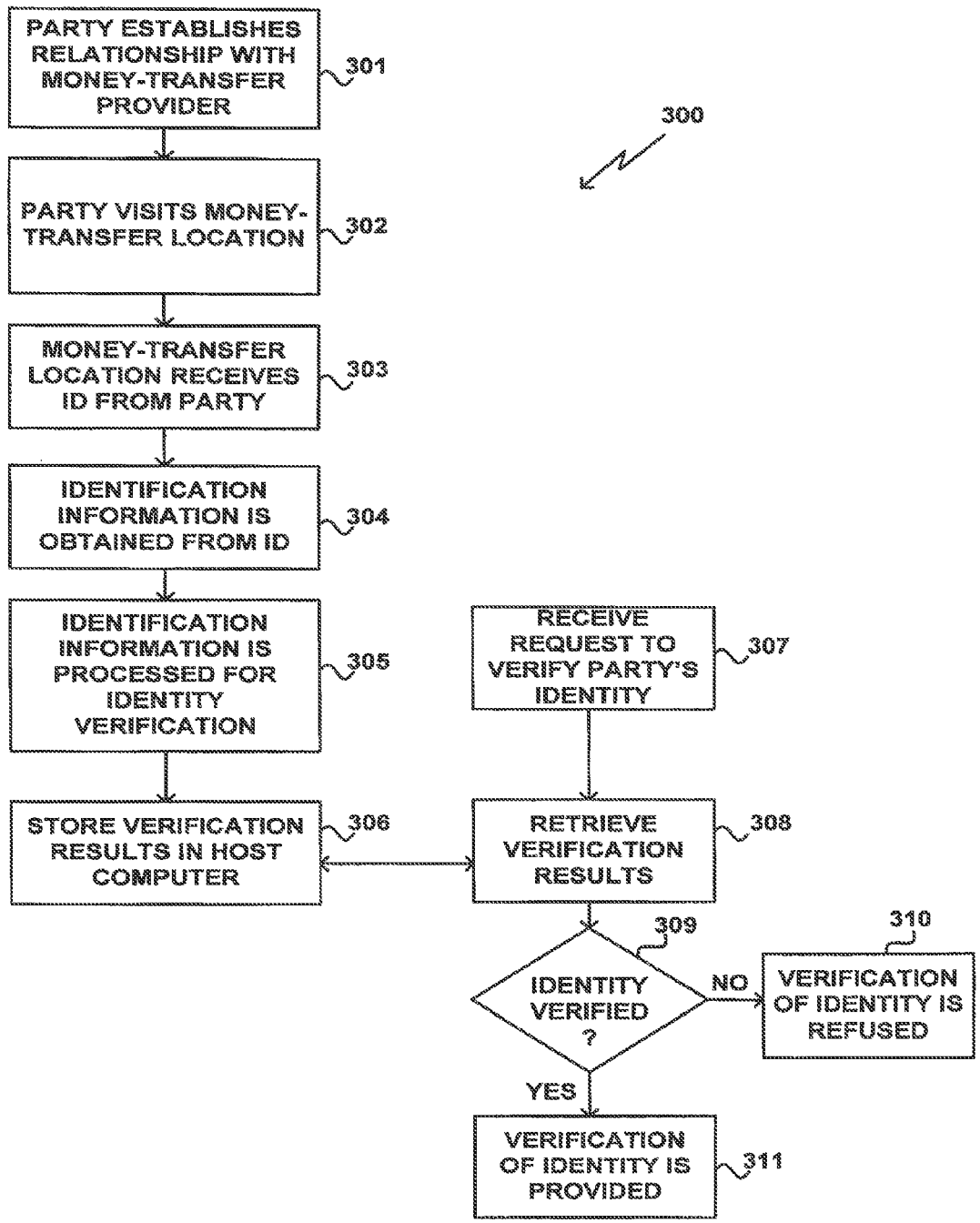
FIG. 3 illustrates another method of verifying an ID according to embodiments of the present invention.

FIG. 3 illustrates a method 300 for providing verification of the identity of a party upon request according to another embodiment of the invention. Method 300 may be used by a money-transfer service provider, for example, to provide an ID verification service to any entity or individual ("party") wishing to have its identity verified by an independent third party in advance, i.e. the money-transfer service provider may provide a "pre-verification" of the party's identity.

At block 301, a party may establish a relationship with a money-transfer service provider that provides a money-transfer system and a communication system by which the party may communicate with the money transfer system, e.g. system 100 shown in FIG. 1. For example, the party may contract with the service provider to provide pre-verification services for a fee. At block 302, the party may visit a money-transfer location of the money-transfer system, either in person or through a transaction processing device such as a computing device 108. At block 303, the money transfer location may receive an ID from the party in accordance with verification criteria established by the service provider. At block 304, identification information may be obtained from the ID, e.g. in the manner previously described in connection with block 213 in FIG. 2. The identification information may then be processed for identity verification at block 305 e.g. in the manner previously described in connection with block 214 in FIG. 2. At block 306, the verification results may be stored, e.g. in host computer 102 for future use. In some embodiments, the service provider may require the party to repeat the steps represented by blocks 302-306 from time to time to assure that the identification information and verification results are kept up-to-date.

At block 307, the service provider may receive a request to provide a verification the party's identity. The verification request may come from the party itself, an entity that is authorized by the party to request an identity verification, or an entity that has entered into a relationship with the service provider to provide identity verification of the party upon request. At block 308, the service provider may retrieve the successful verification results from the host computer, and a determination may be made at block 309 as to whether the identity of the party has been verified. If not, the service provider may refuse to provide a verification of the party's identity at block 310. If the party's identity is determined to have been successfully verified at block 309, and verification of the party's identity may be provided. In one embodiment, this verification may take the form of a certification of identity that is delivered to the requestor, or as directed by the requestor, in written or electronic form.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Accordingly, the above description should not be taken as limiting the scope of the invention, which is defined in the following claims.

What is claimed is:

1. A method for verifying the identity of a second party on behalf of a first party, the method comprising:
   receiving from the first party, by a computer system, verification criteria for verifying the identity of the second party, wherein the verification criteria specifies at least a verification procedure and a type of identification that is acceptable for use in the verification procedure;
   transmitting, by the computer system, the verification criteria to an associate location;
   performing, at the associate location, the verification procedure specified by the verification criteria using an identification document presented by the second party; and
   determining, with the computer system, that the identification document presented by the second party satisfies the verification criteria received from the first party.

2. The method for verifying the identity of a first party on behalf of a second party of claim 1, wherein determining that the identification document presented by the second party satisfies the verification criteria comprises:
   receiving from the associate location, by the computer system, identification information retrieved from the identification document presented by the second party; and
   comparing, with the computer system, the identification information to previously stored information.

3. The method for verifying the identity of a first party on behalf of a second party of claim 1, the method further comprising:
   notifying, with the computer system, at least one of the first party or the second party that the identity of the second party has been verified in accordance with the verification criteria.

4. The method for verifying the identity of a first party on behalf of a second party of claim 1, wherein performing the verification procedure specified by the verification criteria comprises:
   determining whether the identification document presented by the second party is the type of identification that is acceptable for use in the verification procedure per the verification criteria.

5. The method for verifying the identity of a first party on behalf of a second party of claim 1, wherein the verification criteria specifies a plurality of verification procedures.

6. The method for verifying the identity of a first party on behalf of a second party of claim 5, wherein all of the verification procedures specified by the verification criteria must be satisfied to verify the identity of the second party.

7. The method for verifying the identity of a first party on behalf of a second party of claim 5, wherein at least one of the verification procedures specified by the verification criteria must be satisfied to verify the identity of the second party.

8. The method for verifying the identity of a first party on behalf of a second party of claim 1, the method further comprising:
   storing, by the computer system, a record of each verification procedure performed and results thereof.

9. A system for verifying the identity of a second party on behalf of a first party, the system comprising:
   a computer system configured to at least:
      receive, from the first party, verification criteria for verifying the identity of the second party, wherein the verification criteria specifies at least a verification procedure and a type of identification that is acceptable for use in the verification procedure;
      transmit the verification criteria to an associate location;
      perform the verification procedure specified by the verification criteria using an identification document presented by the second party; and
      determine that the identification document presented by the second party satisfies the verification criteria received from the first party.

10. The system for verifying the identity of a second party on behalf of a first party of claim 9, wherein determining that the identification document presented by the second party satisfies the verification criteria comprises:

receiving, from the associate location, identification information retrieved from the identification document presented by the second party; and comparing the identification information to previously stored information.

11. The system for verifying the identity of a second party on behalf of a first party of claim 9, wherein the computer system is further configured to:

notify at least one of the first party or the second party that the identity of the second party has been verified in accordance with the verification criteria.

12. The system for verifying the identity of a second party on behalf of a first party of claim 9, wherein performing the verification procedure specified by the verification criteria comprises:

determining whether the identification document presented by the second party is the type of identification that is acceptable for use in the verification procedure per the verification criteria.

13. The system for verifying the identity of a second party on behalf of a first party of claim 9, wherein the verification criteria specifies a plurality of verification procedures.

14. The system for verifying the identity of a second party on behalf of a first party of claim 9, wherein the computer system is further configured to:

store a record of each verification procedure performed and results thereof.

15. A non-transitory machine readable medium having instructions stored thereon for verifying the identity of a second party on behalf of a first party, the instructions executable by a processor to at least:

receive, from the first party, verification criteria for verifying the identity of the second party, wherein the verification criteria specifies at least a verification procedure and a type of identification that is acceptable for use in the verification procedure;

transmit the verification criteria to an associate location;

perform the verification procedure specified by the verification criteria using an identification document presented by the second party; and determine that the identification document presented by the second party satisfies the verification criteria received from the first party.

16. The non-transitory machine readable medium having instructions stored thereon for verifying the identity of a second party on behalf of a first party of claim 15, wherein determining that the identification document presented by the second party satisfies the verification criteria comprises:

receiving, from the associate location, identification information retrieved from the identification document presented by the second party; and comparing the identification information to previously stored information.

17. The non-transitory machine readable medium having instructions stored thereon for verifying the identity of a second party on behalf of a first party of claim 15, wherein the instructions are further executable by the processor to:

notify at least one of the first party or the second party that the identity of the second party has been verified in accordance with the verification criteria.

18. The non-transitory machine readable medium having instructions stored thereon for verifying the identity of a second party on behalf of a first party of claim 15, wherein performing the verification procedure specified by the verification criteria comprises:

determining whether the identification document presented by the second party is the type of identification that is acceptable for use in the verification procedure per the verification criteria.

19. The non-transitory machine readable medium having instructions stored thereon for verifying the identity of a second party on behalf of a first party of claim 15, wherein the verification criteria specifies a plurality of verification procedures.

20. The non-transitory machine readable medium having instructions stored thereon for verifying the identity of a second party on behalf of a first party of claim 15, wherein the instructions are further executable by the processor to:

store a record of each verification procedure performed and results thereof.

\* \* \* \* \*